United States Patent [19]

Iwahana et al.

[11] 4,296,183

[45] Oct. 20, 1981

[54] AL-SN BASE BEARING ALLOY AND COMPOSITE

[75] Inventors: Keiiti Iwahana; Yoshimi Mathuda; Kenichiro Futamura, all of Toyota, Japan

[73] Assignee: Taiho Kogyo Co., Ltd., Toyota, Japan

[21] Appl. No.: 136,638

[22] Filed: Apr. 2, 1980

[51] Int. Cl.$^3$ .............................................. B32B 15/04
[52] U.S. Cl. ..................................... 428/653; 75/138; 75/140; 75/147
[58] Field of Search ......................... 75/138, 140, 147; 428/653

[56] References Cited

U.S. PATENT DOCUMENTS 4,153,756  5/1979  Iwahana et al. ..................... 75/140

*Primary Examiner*—R. Dean

*Attorney, Agent, or Firm*—Blanchard, Flynn, Thiel, Boutell & Tanis

[57] ABSTRACT

The invention relates to aluminum-tin (Al-Sn) base bearing alloys and bearing materials that are made by applying the alloys to backing steel sheets by pressure welding. The Al-Sn base bearing alloy comprises 3 to 25 wt.% of Sn; 0.1 to 1.0 wt.% of Cr; 9 wt.% or less in total of one or more members of Pb, Bi, In and Cd; and the remainder of Al. The alloy can further contain 3 wt.% or less in total of Cu and/or Mg, thereby improving the bearing characteristics. Besides the effects of the addition of Cr to improve hardness, to avoid the lowering of high temperature hardness and the growth of tin particles, and the resultant improvement in fatigue resistance, the Al-Sn base bearing alloy of the invention is improved in conformability and seizure resistance by the addition of Pb, In and the like which are effective when they are used together with Cr.

6 Claims, No Drawings

AL-SN BASE BEARING ALLOY AND COMPOSITE

BACKGROUND OF THE INVENTION (1) Field of the Invention

This invention relates to an Al-Sn base bearing alloy which is made by adding tin to an aluminum matrix and relates to a bearing material which is made by applying the above bearing alloy to a backing steel sheet by pressure welding. More paticularly, the invention relates to an aluminum base bearing alloy which is low in the growth of tin particles and in the lowering of hardness, and is excellent in fatigue strength at high temperature conditions. The Al-Sn base bearing alloy of the invention is suitable for use after several repetitions of rolling and annealing subsequent to casting.

(2) Description of the Prior Art

The Al-Sn base alloys are mainly used as aluminum base bearing alloys in the conventional art. When these conventional alloys are used for the bearings of automobile internal combustion engines, fatigue failure is sometimes caused to occur in a short time if the engines are continuously operated under heavy loads. This is considered to be due to the fact that the temperature of lubricant oil in an internal combustion engine becomes very high during the continuous full-load running, for example, the temperature of the lubricant oil in an oil pan reaches 130° C. to 150° C., so that the temperature of the sliding surface of the bearing is also raised very high. As the result, since the eutectic point of such the alloy is about 225° C. or so, the hardness of the alloy rapidly becomes low under the high temperature conditions, which causes the fusion and the migration of the Sn component and the fatigue strength is resultantly lowered. The inventors of the present invention have prepared an alloy, the hardness of which is not lowered at high temperatures and the tin component of the alloy is hardly movable. The alloy was worked into the shapes of bearings for internal combustion engines and they were subjected to fatigue tests under dynamic loads at high oil temperatures. As a result, the improvement in fatigue strength was recognised, which substantiated the above-mentioned consideration.

Further, in addition to the lowering of the fatigue strength due to the loss of hardness at high temperatures as mentioned above, the coarsening of tin particles in the texture of a conventional Al-Sn base alloy also causes lowering of the fatigue strength. That is, the aluminum bearing material is generally formed by applying the Al-Sn base alloy to a backing steel sheet through pressure welding, in which an annealing step is required after the pressure welding in order to improve the adhesive strength between both metals. The annealing is generally done at a temperature below the point (about 475° C.) at which an Al-Fe inter-metallic compound deposits and the higher the treating temperature is and the longer the treating time is, the larger the adhesion strength becomes. As a matter of fact, when the conventional Al-Sn alloy is placed in a high temperature condition during annealing, the migration of aluminum grain boundaries and tin particles is caused to occur in the alloy texture and, as a result, the tin particles become coarse. That is, when the conventional aluminum bearing alloy is subjected to annealing in order to improve the adhesive strength to the backing steel, the coarsening of tin particles is brought about, which results in the lowering of the fatigue strength of the Al-Sn base alloy at high temperatures.

BRIEF SUMMARY OF THE INVENTION

The present invention aims to reduce or eliminate one or more of the above-described disadvantages in the conventional Al-Sn base bearing alloy. Accordingly, one object of the present invention is to provide an Al-Sn base bearing alloy which exhibits relatively small loss of hardness at high temperatures, and as a result, has a relatively high fatigue strength.

Another object of the present invention is to provide an improved Al-Sn base bearing alloy in which the coarsening of the tin particles is avoided or moderated during the annealing step or during use under high temperature conditions, which results in a higher fatigue strength.

A further object of the present invention is to provide an Al-Sn base bearing alloy which has excellent conformability as well as high fatigue strength.

Yet a further object of the present invention is to provide a bearing material which is made by applying the above bearing alloy to the surface of a backing steel sheet and to bearing devices for internal combustion engines which are made of the above bearing material.

According to the present invention, the Al-Sn base bearing alloy basically comprises 3.5-25 wt.% of Sn; 0.1-1.0 wt.% of Cr; 9 wt.% or less in total of one or more members selected from the group of Pb, Bi, In and Cd; and the remainder of aluminum. In order to improve the bearing characteristics, the Al-Sn base bearing alloy of the invention can further contain 3 wt.% or less of Cu and/or Mg. As compared with the conventional Al-Sn base alloy, the Sn particles are made fine and the conformability is good in the alloy of the present invention which is attained by the addition of Cr and one or more members of Pb, Bi, In and Cd. Further, in the alloy of the present invention, it was confirmed that the hardness is improved and the migration and growth of tin particles hardly occur. Still further, the lowering of hardness at high temperatures is also small. According to the results of fatigue tests under dynamic loads, the improvement in fatigue strength at high oil temperatures was confirmed.

DETAILED DESCRIPTION OF THE INVENTION

The Al-Sn base bearing alloy of the present invention is prepared by adding the above-mentioned Sn, Cr, and one or more members of the foregoing Pb, Bi, In and Cd to the matrix of aluminum.

Tin (Sn) is added for the main purpose of lubrication. The reason why the content of tin is restricted to the range of 3.5 to 25 wt.% depends upon the fact that, even though the addition of tin in an amount of more than 25 wt.% improves the conformability and low friction property, it reduces the hardness of the bearing alloy to some extent. When the quantity of tin is less than 3.5 wt.%, on the contrary, the bearing alloy becomes too hard and is insufficient in view of the conformability. According to the prior art, the upper limit of the amount of tin has been regarded as being about 15% to the Al-Sn base alloy so as to separately disperse tin particles, because it has been considered that, when more than 15% of tin is contained, the tin particles in the aluminum matrix cannot exist in a separated state but rather they exist in a continuous state and the hardness under high temperature conditions becomes low.

In the present invention, however, the addition of tin up to 25 wt.% has been made possible without any practical disadvantage, by the effect of the addition of the other elements. The addition quantity of tin in the range of 3.5 to 25 wt.% can be determined properly in compliance with expected uses. Generally speaking, the addition quantity of tin is made small when a bearing receives a large load, while for light duty purpose, much tin can be added to the bearing alloy. In another viewpoint, when there is fear of seizure, the addition quantity of tin may be increased, while if there is no fear of seizure, the quantity of tin may be reduced. However, in recent cases, the temperature of the bearing becomes often high due to the high temperature oil and this causes the deformation of the bearing which is followed by the occurrence of seizure and fatigue. Therefore, the addition quantity of tin may be determined from the view point to reduce the deformation at high temperatures.

The addition of chromium (Cr) is effective in that the hardness of the alloy is raised to prevent the alloy from softening at high temperatures and thus the coarsening of tin particles is not caused to occur even in annealing. In the first place, the effects to raise the hardness and to avoid the softening of alloy at high temperatures will be described. When the quantity of chromium is less than 0.1 wt.%, the improvement in high temperature hardness cannot be expected. If the addition quantity of chromium exceeds 1.0 wt.%, the Al-Cr inter-metallic compound cannot be dispersed finely and evenly, therefore, the effect of the addition of chromium becomes low. Accordingly, the addition quantity of chromium is limited to the range of 0.1 to 1.0 wt.%. More particularly in connection with the improvement in the high temperature hardness, the chromium forms a solid solution in aluminum which raises the recrystallization temperature of aluminum and, in addition, the solid solution itself improves the hardness of the aluminum matrix. At the same time, the hardness of the alloy containing chromium becomes higher even when it is subjected to rolling several times which is contrasted to casting. With the rise of the recrystallizing temperature of aluminum, the bearings of engines that are exposed to high temperatures can maintain their mechanical properties. Especially, the lowering of hardness at high temperatures can be reduced and the softening of bearings in a high temperature range can well be avoided, thereby improving the durability of bearings. Further, the Al-Cr intermetallic compound that is deposited over the limit of solid solution, has a Vickers hardness of more than 370 so that the dispersion of such compound aids the bearing alloy in maintaining the hardness at high temperature. Therefore, the dispersion of such inter-metallic compound in a proper quantity gives a good effect. The preferable range of the quantity of chromium is, as described above, 1.0 wt.% or less, and if the quantity of chromium is within such the range, fine and uniform deposition of the inter-metallic compound is formed and it increases the hardness of the bearing alloy.

The effect of the addition of chromium to avoid the coarsening of tin particles will be described in the following. The coarsening of tin particles is a phenomenon owing to the migration of aluminum grain boundaries and tin particles in a high temperature condition of the Al-Sn alloy. Since the chromium is precipitated as the above-mentioned Al-Cr intermetallic compound which is finely dispersed in the aluminum alloy matrix, this inter-metallic compound inhibits directly the migration of aluminum grain boundaries and, at the same time, it obstructs the growth of aluminum crystal grains. Therefore, the migration of tin particles is also hindered and, as a result, the coarsening of tin particles can be avoided. This is related to the fact that the finely divided tin particles are retained as they stand during repetition of rolling and annealing, and the above-described various effects can be obtained. Such a phenomenon can be observed when the quantity of tin is small. However, the effect becomes larger when the quantity of tin is relatively large (more than about 10 wt.%). Especially, in the case that the quantity of tin exceeds about 15 wt.% in which the tin particles tend to exist in a continued state, the effect of addition becomes notable. Further, even when the quantity of tin is less than 10 wt.%, the effect of the addition of chromium is, of course, expected sufficiently according to use conditions and utilities of the alloy. Furthermore, the liquidation of tin particles having a low melting point of about 232° C. can be prevented effectively under high temperature conditions because the tin particles are well maintained in a finely divided state in the aluminum matrix. From this viewpoint, the effect to avoid the lowering of hardness will be understood.

In the above passage, the effect for preventing the coarsening of tin particles in the annealing step is described. This effect can also be expected in the working condition of the bearing material in which the temperature is equal to the annealing condition. Accordingly, the fatigue strength in practical uses can also be improved with the inhibition of softening.

In addition, in the bearing alloy of the present invention, the property of tin as a lubricating metal can further be improved by adding more than zero to 9 wt.% in total of one member or more members of lead (Pb), bismuth (Bi), indium (In) and cadmium (Cd). The effect of the addition of lead, bismuth, indium and cadmium is exhibited when they are added together with chromium. In the prior art, it has been considered that these elements are added to Al-Sn base alloys and the addition has been practised in some cases. However, when only these elements are added to the Al-Sn base alloy, they form alloys so that the disadvantage that the melting point of tin becomes low cannot be avoided. Thus, the fusion and the migration of tin at low temperatures are liable to occur in the prior art Al-Sn base alloy, which causes the growth of tin particles into larger and coarse ones. When such alloy is employed as a bearing material, partial fusion and scraping are caused to occur under continuous heavy load running. On the contrary, the tin particles are made fine by the addition of chromium and such texture is maintained at high temperatures in the bearing alloy of the present invention. Therefore, even when one or more members of the above lead, bismuth, indium and cadmium are added to the alloy, the lubricating property of tin can be improved without causing the above troubles in the prior art. Further, the bearing alloy of the invention can be used for the bearing of which a high fatigue strength is required. In addition, it becomes possible to improve the conformability of the bearing material. As described above, the addition quantity of one or more members of lead, bismuth, indium and cadmium having the above effects is in the range of more than zero to 9 wt.% in total. Meanwhile, among the above additives, lead and indium are preferred and bismuth and cadmium are of the next order. This depends upon the fact that lead and indium are liable to flow under pressure to improve the sliding property and conformability. Bismuth and cadmium are somewhat harder and higher in boiling points as compared with lead and indium.

In addition to the above-described compositions of the present invention, the bearing alloy can further contain more than zero to 3 wt.% of copper (Cu) and/or magnesium (Mg). The copper and/or magnesium are added in view of the fact that they reduce the lowering of the hardness at high temperatures. The preferable range of the addition of them is in the range of 0.1 to 2.0 wt.%. When the addition quantity of them is less than 0.1 wt.%, the rise of hardness cannot be expected so much, while if the addition quantity is more than 3.0 wt.%, the alloy becomes too hard, thereby to reduce the ductility and, in addition, the anticorrosiveness is lowered. Further, with regard to magnesium, the addition of more than 3 wt.% increases the hardness. However, the rise in hardness with the roll working becomes too large. Therefore, satisfactory rolling cannot be performed and it becomes difficult to obtain a quite fine tin texture. Furthermore, the magnesium existing as a solid solution in the aluminum matrix is liable to deposit during the annealing. Therefore, the reinforcing of the aluminum matrix by the solid solution cannot be expected owing to the deposition of the excess magnesium. Therefore, the preferable addition quantity is 2.0 wt.% or less. Further, the effect of the addition of copper and/or magnesium is exhibited when the chromium is added simultaneously, and the effect to raise hardness at high temperatures cannot be expected when only the copper and/or magnesium are added. In other words, if copper and/or magnesium are added to the aluminum matrix, the rise of hardness in rolling is large, which is remarkable as compared with the case in which other elements are added to the aluminum matrix. It is to be noted, however, that the aluminum matrix containing the copper and/or magnesium is easily softened at about 200° C. Therefore, it cannot be expected to maintain the hardness at high temperatures. On the contrary, when the copper and/or magnesium are added together with chromium, the hardness which is raised during the rolling by the effect of the addition of the copper and/or magnesium is not so much lowered by the annealing, which is brought about by the addition of the chromium. This hardness can be maintained under high temperature conditions, therefore, as compared with the prior art alloys. The bearing alloy of the present invention has a higher hardness at high temperatures, which results in the improvement in the fatigue strength. When both the copper and magnesium are added, it is desirable that the total quantity of them is not more than 3 wt.%, while the quantity of copper itself is not more than 2 wt.%.

The above described Al-Sn base bearing alloy is mainly used as the sliding bearings of automobile internal combustion engines or the like, in which the bearing alloy is generally applied to backing steel sheets by pressure welding and, in order to increase the adhesive strength, annealing is done after the pressure welding. However, in the prior art Al-Sn base alloys, the lowering of the hardness, the fusion of tin particles and so forth are caused to occur because the migration of aluminum grain boundaries and tin particles in the alloy texture is brought about which causes the coarsening of the tin particles. While in the present invention, the migration of aluminum grain boundaries and the growth of aluminum crystal particles are effectively avoided by the precipitated substance of Al-Cr inter-metallic compound which is generated in the rolling and annealing steps. Therefore, the bearing alloy of the present invention is free from the above ill influences of annealing and, as a result, the adhesion strength between the Al-Sn base alloy and backing steel sheets can be made high by raising the temperature of annealing. Since the above fact can be applied to the case in which the bearing alloy of the present invention is placed under the circumstances which correspond to the temperature of annealing, it is quite meaningful that the fatigue strength can be improved by avoiding the softening.

With taking all the properties into consideration such as the adaptability to casting and rolling, the adhesiveness to backing steel sheet, the workability, and the sliding characteristic, the most preferable composition of the bearing alloy of the present invention is 7.5–25 wt.% of Sn; 0.1–0.7 wt.% of Cr; 0.5–5.0 wt.% of Pb, Bi, In and/or Cd; 0.1–2.0 wt.% of Cu and/or Mg; and the remainder of Al.

In the following, the present invention will be described further in detail with reference to several examples.

The following Table A shows the compositions of the alloys (specimens) of the present invention 1 to 14 and comparative alloys (specimens) 15 to 17.

In the preparation of the alloys 1 to 14, aluminum material was melted in a gas furnace and, in accordance with the formulae of Table A, Al-Cu, Al-Mg, Al-Cr base alloys were dissolved. After that, Sn and Pb, Bi, In and Cd were added and degassing was performed. Then, metal mold casting was performed, which was followed by repeated rolling and annealing (at 350° C.) to obtain specimens. The high temperature hardnesses of the specimens were then measured. In the next step these specimens were subjected to rolling and after that, the alloy specimens were applied to backing steel sheets by pressure welding to obtain bimetallic specimens. These were then subjected to annealing and worked into plane bearings and fatigue tests under dynamic loads and seizure tests were performed. In like manner as the above, alloys 15 to 17 for comparative tests were also prepared and they were subjected to the same tests.

In connection with the above alloys, the results of tests on Vickers hardnesses at the ordinary temperatures and 200° C., fatigue resistances under dynamic loads and seizure properties when the alloys were brought into contact with steel shafts are shown in the following Table B.

In the dynamic load fatigue tests, $10^7$ times loads were applied to the respective bearing alloys under the following conditions. The intensities of loads at which fatigue occurred were measured.

| Test Conditions | |
| --- | --- |
| Test machine: | Soda Dynamic Load Tester |
| Sliding velocity: | 400–470 m/min. |
| Lubricant oil: | SAE 10 W 30 |
| Lubricating method: | Forced lubrication |
| Lubricant temperature: | 140° C. ± 5° C. |
| Contacting material: | Kind of material: S 55 C |
| | Surface roughness: 1 μm |
| | Hardness: Hv 500–600 |
| Shape of bearing: | Dia. × width: 52 × 20 mm |
| | Half-split metal |
| | Surface roughness: 1–3 μm |
| Lubricant oil press.: | 5 Kg/cm$^2$ |

In the above seizure tests, the loads were increased at a rate of 50 Kg/cm$^2$ per 20 minutes under the following test conditions, and the loads at which the seizure occurred were measured.

| Test Conditions | |
|---|---|
| Test machine: | Ultrahigh pressure seizure tester |
| Sliding velocity: | 468 m/min. |
| Load: | Gradually increased 50 Kg/cm² per every 20 minutes |
| Lubricant oil: | SAE 10 W 30 |
| Lubricating method: | Forced lubrication |
| Lubricant temperature: | 140° C. ± 5° C. |
| Lubricant oil press.: | 5 Kg/cm² |
| Contacting material: | Kind of Material: S 50 C |
| | Surface roughness: 0.3-0.8 μm |
| | Hardness: Hv 500-600 |
| Shape of bearing: | Dia. × width: 52 × 20 mm |
| | Half-split metal |
| | surface roughness: 1-3 μm |

TABLE A

| Alloy Example Numbers | Constituent Element (wt. %) | | | | | | | | |
|---|---|---|---|---|---|---|---|---|---|
| | Al | Sn | Cr | Pb | Bi | In | Cd | Cu | Mg | Si |
| This Invention | | | | | | | | | |
| 1 | Re | 3.5 | 0.1 | 5.0 | | | | 4.0 | | |
| 2 | Re | 7.0 | 0.4 | 3.0 | 1.0 | 2.0 | | | | |
| 3 | Re | 10 | 0.3 | 3.0 | | | | | | |
| 4 | Re | 15 | 0.8 | 1.0 | | | | | | |
| 5 | Re | 20 | 0.5 | | 2.0 | 0.5 | 1.0 | | | |
| 6 | Re | 25 | 1.0 | 2.0 | 0.5 | | | | | |
| 7 | Re | 5.0 | 0.2 | 4.0 | | | | 0.1 | | |
| 8 | Re | 10 | 0.3 | 3.0 | | | | 1.0 | | |
| 9 | Re | 15 | 0.4 | 3.0 | | | | 0.3 | | |
| 10 | Re | 20 | 0.6 | 1.0 | | | | 2.0 | 1.0 | |
| 11 | Re | 25 | 0.9 | 0.5 | | | | 0.5 | 0.5 | |
| 12 | Re | 6.0 | 0.3 | 4.0 | | | | 0.3 | | |
| 13 | Re | 10 | 0.5 | 2.0 | | | | 0.5 | | |
| 14 | Re | 15 | 0.4 | 1.0 | | | | 0.8 | | |
| Prior Art | | | | | | | | | |
| 15 | Re | 6.0 | | | | | | 1.0 | | 1.5 |
| 16 | Re | 20 | | 2.0 | | | | 0.5 | | |
| 17 | Re | 30 | | | | | | 2.0 | | |

Note:
Re = Remainder

TABLE B

| Alloy Example Numbers | Hardness (Hv) | | Fatigue Resistance (Kg/cm²) | Load at Seizure (Kg/cm²) |
|---|---|---|---|---|
| | Ordinary Temperature | 200° C. | | |
| This Invention | | | | |
| 1 | 35 | 18 | 600 | 800 |
| 2 | 38 | 21 | 640 | 800 |
| 3 | 37 | 20 | 620 | 800 |
| 4 | 41 | 21 | 620 | 700 |
| 5 | 37 | 20 | 620 | 900 |
| 6 | 38 | 21 | 600 | 800 |
| 7 | 35 | 20 | 640 | 900 |
| 8 | 45 | 25 | 700 | 900 |
| 9 | 45 | 25 | 680 | 1,000 |
| 10 | 55 | 33 | 680 | 800 |
| 11 | 52 | 31 | 660 | 800 |
| 12 | 46 | 25 | 640 | 800 |
| 13 | 45 | 25 | 680 | 900 |
| 14 | 46 | 26 | 680 | 800 |

TABLE B-continued

| Alloy Example Numbers | Hardness (Hv) | | Fatigue Resistance (Kg/cm²) | Load at Seizure (Kg/cm²) |
|---|---|---|---|---|
| | Ordinary Temperature | 200° C. | | |
| Prior Art | | | | |
| 15 | 38 | 16 | 560 | 500 |
| 16 | 28 | 14 | 560 | 700 |
| 17 | 40 | 16 | 480 | 600 |

As clearly understood from the data in Table B, all the alloys 1 to 14 of the present invention have higher hardnesses at elevated temperatures as compared with the comparative alloys 15 to 17. In view of the fact that the hardnesses of the prior art alloys 15 and 17 are higher than some of the alloys of the present invention at low temperature range, it will be understood that the lowering of hardnesses in high temperature range of the alloys of the invention are small, which fact provides the effect that the change in bearing conditions with the change of temperature is small.

Furthermore, the alloys 1 to 14 of the present invention gave good results in the dynamic load fatigue tests and seizure tests. The excellent results in the seizure tests is considered to be the effect of addition of Pb, Bi, In and Cd.

Incidentally, it should be noted that in the composition of the alloys of the present invention, the aluminum may of course contain a trace quantity of impurities which cannot be eliminated by the ordinary refining technique.

Although the present invention has been described in connection with the preferred examples thereof, many variations and modifications will now become apparent to those skilled in the art. It is preferred, therefore, that the present invention be limited not by the specific disclosure herein but only by the appended claims.

What is claimed is:

1. An Al-Sn base bearing alloy consisting essentially of 3.5 to 25 wt.% of Sn; 0.1 to 1.0 wt.% of Cr; 0.5 to 9 wt.% in total of one or more members selected from the group consisting of Pb, Bi, In and Cd; and the remainder is Al.

2. The Al-Sn base bearing alloy as claimed in claim 1, wherein said bearing alloy contains 7.5 to 25 wt.% of Sn; 0.1 to 0.7 wt.% of Cr; and 0.5 to 5.0 wt.% of one or more members selected from the group consisting of Pb, Bi, In and Cd.

3. A bearing material which is made by applying said bearing alloy as claimed in claim 1 to a backing steel sheet by pressure welding.

4. An Al-Sn base bearing alloy consisting essentially of 3.5 to 25 wt.% of Sn; 0.1 to 1.0 wt.% of Cr; 0.5 to 9 wt.% in total of one or more members selected from the group consisting of Pb, Bi, In and Cd; up to 3 wt.% in total of Cu and/or Mg; and the remainder is Al.

5. The Al-Sn base bearing alloy as claimed in claim 4, wherein said bearing alloy contains 7.5 to 25 wt.% of Sn; 0.1 to 0.7 wt.% of Cr; 0.5 to 5.0 wt.% of one or more members selected from the group consisting of Pb, Bi, In and Cd; and 0.1 to 2.0 wt.% of Cu and/or Mg.

6. A bearing material which is made by applying said bearing alloy as claimed in claim 5 to a backing steel sheet by pressure welding.

* * * * *